United States Patent [19]

Bailey et al.

[11] 4,351,730

[45] Sep. 28, 1982

[54] TREATMENT OF BIOLOGICALLY-DEGRADABLE WASTE

[75] Inventors: Martin Bailey; David A. Hines; John C. Ousby; Frank C. Roesler, all of Stockton-on-Tees, England

[73] Assignee: Imperial Chemical Industries Limited, London, England

[21] Appl. No.: 213,596

[22] Filed: Dec. 5, 1980

Related U.S. Application Data

[63] Continuation of Ser. No. 882,224, Feb. 28, 1978, abandoned, which is a continuation of Ser. No. 467,511, May 16, 1974, abandoned.

[30] Foreign Application Priority Data

May 16, 1973 [GB] United Kingdom ............... 23328/73
Nov. 2, 1973 [GB] United Kingdom ............... 53921/73

[51] Int. Cl.³ .......................... C02F 3/22; C02F 3/26
[52] U.S. Cl. ................................. 210/629; 210/758; 210/765; 210/170; 210/195.1; 210/220; 210/221.1; 261/36 R; 261/121 R
[58] Field of Search ............... 210/629, 758, 765, 167, 210/170, 194, 195.1, 195.2, 199, 220, 221.1; 261/36 R, 64 R, 77, 121 R, 124, DIG. 75

[56] References Cited

U.S. PATENT DOCUMENTS

| 895,229 | 8/1908 | Beddoes | 210/629 |
|---|---|---|---|
| 2,717,774 | 9/1955 | Obma | 210/220 X |
| 3,439,807 | 4/1969 | Danjes | 210/629 |
| 3,476,366 | 11/1969 | Brooks et al. | 261/36 |
| 3,606,999 | 9/1971 | Lawless | 261/124 X |
| 3,643,403 | 2/1972 | Speece | 261/DIG. 75 |
| 3,662,890 | 5/1972 | Grimshaw | 210/758 X |
| 3,694,353 | 9/1972 | Yang et al. | 210/629 |
| 3,794,303 | 2/1974 | Hirshon | 261/77 X |
| 3,804,255 | 4/1974 | Speece | 210/194 |

FOREIGN PATENT DOCUMENTS

| 213350 | 2/1961 | Austria | 210/765 |
|---|---|---|---|
| 1928681 | 12/1970 | Fed. Rep. of Germany | 210/220 |
| 47-3089272 | 11/1972 | Japan . | |
| 48-191373 | 1/1973 | Japan . | |
| 1231297 | 5/1971 | United Kingdom . | |
| 287605 | 1/1971 | U.S.S.R. | 210/220 |

OTHER PUBLICATIONS

Speece, "U-Tube Stream Reaeration", *Public Works,* Aug. 1969, pp. 111-113.
Babbit, "University of Illinois . . . ", 268, Jul. 1934, pp. 29-36.
Mavinic, et al., "Proc. 6th Canadian Symp. . . . ", 2/71; pp. 229-248.
Speece 1969, "General Sanitary Engineering . . . ", pp. 563-573.
Speece 1971, "Journal American Waterworks . . . ", 63, pp. 6-9.
Budd, et al, "Sewerage and Industrial Wastes", 29, 1957, pp. 237-253.
"J. Japan Waterworks . . . ", 271, 5/57, pp. 32-37.
"Chem. Eng. (Japan)", 13, 1968, No. 1, pp. 17-21.
"Kagaku Kogaku", 33, 10, 1969, pp. 17-22.

*Primary Examiner*—Robert H. Spitzer
*Attorney, Agent, or Firm*—Cushman, Darby & Cushman

[57] ABSTRACT

A method for the secondary treatment of sewage (and apparatus therefor) having a step in which sewage is circulated around a system having a riser and a downcomer communicating with each other at their upper and lower ends and in which an oxygen-containing gas is supplied to the sewage as it passes through the downcomer. The method is intended for use in the aeration and/or digestion steps in the secondary treatment of sewage. The riser and downcomer are preferably located in a shaft extending into the ground for at least 40 meters below a basin containing the sewage.

8 Claims, 13 Drawing Figures

TREATMENT OF BIOLOGICALLY-DEGRADABLE WASTE

This is a continuation, of application Ser. No. 882,224 filed Feb. 28, 1978, which in turn is a continuation of Ser. No. 467,511, filed May 16, 1974, both abandoned.

This invention relates to a method and apparatus for the treatment of liquid-borne biologically-degradable waste material hereinafter referred to as sewage which term is to be understood to include all types of biologically-degradable domestic and industrial waste materials for example normal domestic waste, the effluents produced by farms, food factories and other industries producing such waste.

The methods generally employed in the treatment of sewage comprise essentially a primary treatment by physical methods such as screening and sedimentation to remove large suspended solids followed by a secondary treatment by biological methods to remove organic materials. The present invention relates to the secondary treatment stage.

The sewage entering the secondary treatment stage in a typical contemporary sewage treatment system contains organic matter in relatively low concentration. This sewage is treated by an aerobic biological process such as the activated sludge, percolating filter or high-rate bio-filter processes, in which the organic matter is brought into close contact with air and microorganisms present in the sewage. Part of the organic matter is oxidised by the microorganisms to carbon dioxide and water releasing energy, another part being converted into cellular material. The cellular material forms the activated sludge which is separated from the liquid component of the sewage in settling tanks. The amount of activated sludge produced—representing a large proportion of the original organic matter in the sewage—depends on a number of factors such as temperature, pH, the nature of the organic matter and the presence of mineral nutrients. The object of most contemporary sewage systems is to produce an activated sludge possessing good flocculating and settling properties.

The activated sludge is usually subjected to further biological treatment in anaerobic digesters to convert it to relatively inoffensive stabilised sludge and to improve the conditions for further removal of liquid. There is also a reduction in the volume of sludge for ultimate disposal as the anaerobic digestion converts some of the organic cellular material into a gaseous mixture comprising principally methane and carbon dioxide. The stabilised sludge is disposed of by spraying on land or dumping at sea or, after further removal of liquids, by incineration or bulk dumping on land.

In sewage treatment systems presently in general use, aeration of the sewage is effected by blowing air into the lower parts of large reservoirs through which the sewage passes or by surface aeration.

Increasing requirements in connection with the cleaning up of inland waterways, tidal estuaries and coastal waters and the increasing need for re-use of water for domestic and industrial consumption have led to greater demands being placed upon sewage treatment systems. Also the amount of organic matter i.e. the biological oxygen demand(BOD) loading in domestic sewage is expected to increase within the next decade due to an increased population density and new methods of kitchen waste disposal. The rate of oxygen absorption which can be achieved using the aeration methods presently employed in sewage treatment systems is however severely limited. Preent sewage treatment systems can only be adapted to meet a significant increase in loading by increasing the number and/or area of the reservoirs in which aeration is effected, thus greatly increasing the land area required for such systems.

The purpose of the present invention is to increase the intensity of treatment and to diminish the land area required for sewage works of a given capacity.

According to the present invention we provide a method for the treatment of sewage which comprises a step wherein the sewage is circulated around a system comprising a chamber of descending flow (hereinafter referred to as the downcomer) and a chamber of ascending flow (hereinafter referred to as the riser) communicating with each other at their upper and lower ends, an oxygen-containing gas (as hereinafter defined) being supplied to the sewage as it passes through the downcomer.

Also according to the invention we provide apparatus for circulating a liquid, for example sewage during treatment thereof, comprising a chamber in which circulating liquid descends (hereinafter referred to as the downcomer) and a chamber in which circulating liquid ascends (hereinafter referred to as the riser) communicating with each other at their upper and lower ends, means for circulating liquid around the system and means for supplying an oxygen-containing gas (as hereinafter defined) to liquid in the downcomer.

In this specification the phrase oxygen-containing gas is to be understood to mean oxygen or any gaseous mixture, such as air, containing oxygen.

It should also be understood that in some cases in the apparatus of the invention the means for supplying an oxygen-containing gas to liquid in the downcomer may function also as the means for circulating liquid around the system.

The invention can suitably be employed in the aeration and digestion stages of the secondary treatment of sewage. Preferably the invention is employed in both stages.

The downcomer and riser may be of any convenient cross-sectional shape, e.g. circular or semi-circular. They may be disposed externally to each other but are preferably disposed within a single structure (preferably cylindrical) divided internally by a partition or partitions or with the downcomer formed by a tube inside the structural tube—the outer space forming the riser. A wide variety of geometrical arrangements is possible. The system may comprise a plurality of risers and/or downcomers, e.g. two downcomers combined with a single riser all located within the same outer structure.

Suitably sewage after primary treatment passes into a basin in which gas-disengagement can occur during the operation of the method of the invention. The downcomer and riser extend below the level of the base of the basin. Thus when the basin is situated at or below ground level the structure containing the riser and downcomer is a shaft (preferably cylindrical) extending into the ground. The shaft may extend into the ground at a position external to the basin but is preferably below it, the upper ends of the riser and the downcomer opening into the basin. In some embodiments of the invention the downcomer extends above the level of sewage in the basin. In such embodiments however the downcomer extends for a major proportion of its length below the level of the base of the basin. In such cases the upper end of the riser opens into the basin whilst the upper end of the downcomer communicates through a conduit with sewage in the basin.

Suitably the system extends for at least 40 meters vertically below the level of sewage in the basin, but preferably for 80 meters or more, especially 150-250 meters below. The total effective cross-sectional area of the riser or risers preferably exceeds that of the downcomer or downcomers. Suitably the ratio of the total effective cross-sectional area of the riser or risers to that of the downcomer or downcomers is within the range 1:1 to 2:1.

Any suitable circulating means may be used to circulate sewage around the system. Very suitably the circulation is produced by injecting an oxygen-containing gas into the system.

In a preferred embodiment of the invention means are provided for injecting an oxygen-containing gas (preferably air) into both the downcomer and the riser. Preferably gas injection into the two chambers takes place at positions of equal hydrostatic pressure. Thus, since the upper part of the riser will contain a greater proportion of gas bubbles than does the upper part of the downcomer (which will contain little or substantially no gas), the position of gas injection into the riser is preferably slightly lower than that into the downcomer. In practice however it is satisfactory if gas injection into both chambers is made at substantially the same distance below the level of sewage in the basin. The gas to both injection positions may then be supplied using the same compressor, the proportions injected into the riser and downcomer respectively being controlled by valves.

Preferably gas is injected into both chambers at a position between 0.1 and 0.4 times their total length below the level of sewage in the basin i.e. 15 to 100 meters below when the system extends from 150 to 250 meters below this level. It is preferred that gas injection takes place at a position more than 30 meters below the level of sewage in the basin.

When the sewage treatment apparatus of the invention is started up, all or most of the oxygen-containing gas is injected into the riser causing its upper section to act as an air-lift pump. When an initial start up period has elapsed and the sewage is circulating satisfactorily at a suitable velocity, e.g. at least 1 meters/sec in the downcomer, the proportion of the gas which is supplied to the downcomer may be greatly increased; preferably until at least 50% and in some instances until all of the gas is supplied to the downcomer. The method of the invention may then be continuously operated under these conditions, the proportions of gas injected into the two chambers being varied slightly if conditions change, in order to control the circulation of the sewage.

When the method is being operated steadily after the initial start-up period, gas bubbles injected into the downcomer are borne rapidly downwards by the circulating sewage to levels of higher pressure and their size diminishes. Ultimately in the lower levels of a deeply-sunk apparatus many of the bubbles will be entirely absorbed into the sewage. As the sewage rises up the riser the bubbles will first reappear and then increase in size. Thus the upper part of the riser, above the level of gas-injection into the downcomer, will contain more gas than the upper part of the downcomer and will continue to function as an air-lift pump even though all or a major proportion of the gas is being injected into the downcomer. Indeed once circulation has commenced and gas bubbles injected into the downcomer are borne downwardly at a suitable rate, e.g. above 1 meter/sec., the effect of injecting gas into the downcomer will be to add to the effect of any gas injected into the riser in producing a difference in pressure between the upper parts of the two chambers.

When the sewage is circulating steadily around the system its velocity in the downcomer is preferably 1.2 to 2.0 meters/sec. The velocity in the riser is preferably at least 0.5 meters/sec, particularly 1.0 to 1.5 meters/sec. During treatment by the method of the invention sewage will generally circulate around the system a large number of times, one complete circulation generally taking between 2 and 6 minutes depending upon the dimensions of the system. The total duration of treatment by the method of the invention will depend upon whether it is employed as the aeration or digestion step. In the former case the period during which the sewage is circulated will generally be $\frac{1}{4}$ to 4 hrs whilst in the latter it will be longer, e.g. 2 to 30 days depending upon the rate at which sewage is supplied to the apparatus.

When the method of the invention is used both as the aeration and digestion steps of the secondary treatment, the two treatment units may be built into the same structure, being separated by a partition constructed in such a way as to restrict heat transfer between the two parts e.g. a concrete partition or a steel partition containing an internal insulating layer. The upper part of the position may be constructed of thermally conductive material, e.g. steel, or steel with hollow partitions containing water to transfer heat generated during the digestion step to the aeration step. The level of the water may be varied to control the amount of heat transferred.

Untreatable solid objects, e.g. stones, pieces of metal and the like, will occur in the sewage occasionally and will eventually impede the operation of the method of the invention if not removed. It is therefore preferred that a space should be provided at the lower end of the system wherein such objects may collect for example the outer chamber may be formed with a conical or hemispherical lower end. Means, for example a dip-pipe or pipes (which may be of differing diameter) extending up the shaft to a pit below the hydraulic sewage level, may be provided for the continuous or periodic removal of objects which have collected in this space.

It is envisaged that the method of the invention may be most conveniently performed with the riser and downcomer sunk into the ground in a deep shaft having e.g. a concrete lining which may form this external wall. The shaft may be produced by various means e.g. by conventional sinking methods, drilling or auger-boring. The lining of the shaft may be formed with a leak-proof barrier within it if required.

The invention is not restricted to the gas-supplying means and liquid-circulating means described above in connection with the preferred embodiment since any suitable gas-supplying and liquid-circulating means may be employed.

In an alternative embodiment of the invention the method for the treatment of sewage comprises a step wherein the sewage is circulated from a basin around a system comprising a downcomer connected at its upper part to a conduit and at its lower part to a riser whose upper part is connected to the basin, the sewage being circulated upwardly from the basin through the conduit into a low-pressure region in the upper part of the downcomer wherein it is at a sub-atmospheric pressure and an oxygen-containing gas being supplied to the sewage as it passes through the low-pressure region.

The apparatus of the alternative embodiment comprises a downcomer and a riser connected at their lower parts, the upper part of the riser being connected to a basin and the upper part of the downcomer being connected to a conduit extending upwardly from within the basin, circulating means for circulating liquid from the basin into the conduit and means for supplying an oxygen-containing gas to the upper part of the downcomer at a point where liquid passing down the downcomer is at a sub-atmospheric pressure.

In this alternative embodiment the upper end of the downcomer extends above the level of the sewage in the basin, preferably for a vertical distance of between 3 and 9 meters, and is then bent downwardly to form the conduit, whose open end is submerged in the sewage in the basin (e.g. the conduit and the upper end of the downcomer form an inverted U-tube). Any suitable means may be used to draw sewage upwardly into the conduit and circulate it around the system. Examples of suitable circulating means include propellers, axial-flow pumps, axial-flow turbines and injection of an oxygen-containing gas into the riser.

In this last case oxygen-containing gas is suitably injected into the riser at a position between 0.1 and 0.4 times the total length of the riser below the level of sewage in the basin, ie. 15 to 100 meters below when the system extends from 150 to 250 meters below this level. This causes the upper section of the riser to act as an air-lift pump. The amount of gas injected into the riser is determined by the depth of the injection point, the liquid circulation rate and the amount of gas supplied to the downcomer. In this embodiment if injection of an oxygen-containing gas is used as the circulating means the amount of gas supplied to the riser will usually be substantially larger than the amount supplied to the downcomer.

In the alternative embodiment gas supplying means is suitably situated in the downcomer at a vertical height within the range 1 to 6, especially 2 to 5 meters above the surface of the sewage in the basin, the oxygen-containing gas being drawn into the circulating sewage because the pressure inside the downcomer at this point is sub-atmospheric. The gas-supplying means is suitably one or a plurality of flat-shaped tubes each having lateral holes through which gas may be drawn transversally into the circulating sewage. The holes are preferably such as to produce bubbles of initial diameter within the range 2 mm to 8 mm which are carried downwards by the circulating sewage.

The invention enables a high power transfer ratio for the oxygen in the aerating gas into the circulating sewage to be achieved. The invention also enables efficient absorption of oxygen into the sewage to be achieved, efficiencies in excess of 95% in respect of gas supplied to the downcomer being possible in preferred cases. When air is injected into the riser to effect circulation some useful oxygen absorption from this air stream will occur supplementing absorption from gas injected into the downcomer. Use of the invention will also lead to an economy in the land area required for sewage treatment systems since there is less restriction on the BOD loading which can be handled adequately by a system occupying a given area than is the case with conventional systems. Owing to its lower area the apparatus is readily covered to control the escape of gases and to provide a more pleasing visual appearance.

In existing sewage plants using the activated sludge process in the form of aerated tanks or basins the transfer rates achieved are up to about 0.1 kg $O_2$/hr/m$^3$ of liquid. Using the method and apparatus of the invention tranfer rates can be increased by a factor that will depend on the requirements of the process but can be depending on the features of the system, as high as ten fold, is 1 kg$O_2$/hr/m$^3$. However in many applications it is expected that only an increase by a factor of 2 to 3 will be required.

The invention is illustrated by the accompanying drawings wherein.

Figure 1:
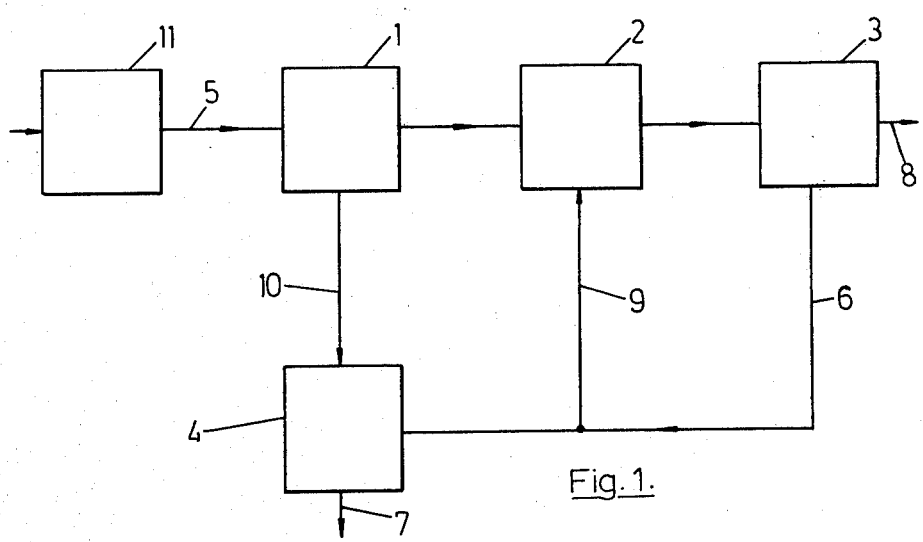
FIG. 1 is a schematic diagram of a sewage treatment system in which the method and apparatus of the invention may be employed.

In the system shown in FIG. 1, raw sewage entering the system is first subjected to screening, maceration and degritting in primary treatment stage II. Here large or dense and intractable solid articles carried along in the sewage stream, e.g. dead bodies of animals, bottles, cartons and like objects are removed. Influent raw sewage than passes along channel 5 into primary settling tank 1 in which a proportion, e.g. about 70%, of the suspended solids settles out as raw sludge and passes direct to digester 4 along channel 10. Liquid containing the remaining suspended solids passes to the activated sludge system 2, suitably an apparatus according to the invention, wherein it is aerated and circulated.

In the activated sludge system 2 the sewage is brought into intimate contact with air and microorganisms and converted into $CO_2$ and further sludge. The activated sludge passes to settling tank 3 from which liquid is removed along channel 8 for tertiary treatment or discharge from the system. From settling tank 3 the activated sludge is removed along channel 6 and returned to the activated sludge system 2 along channel 9, a proportion (i.e. the excess) being fed to digester 4. Digester 4 is suitably an apparatus according to the invention in which the excess activated sludge together with raw sludge from primary settling tank 1 is aerated and circulated, thus reducing significantly the initial quantity of combined sludge and leaving a relatively inoffensive stabilised sludge which is discharged along channel 7. The stabilised sludge is finally disposed of in any suitable manner, e.g. by subjection to further settling and filtration steps (not shown in the drawing), any further liquid removed being returned to the activated sludge system 2.

Figure 1A:
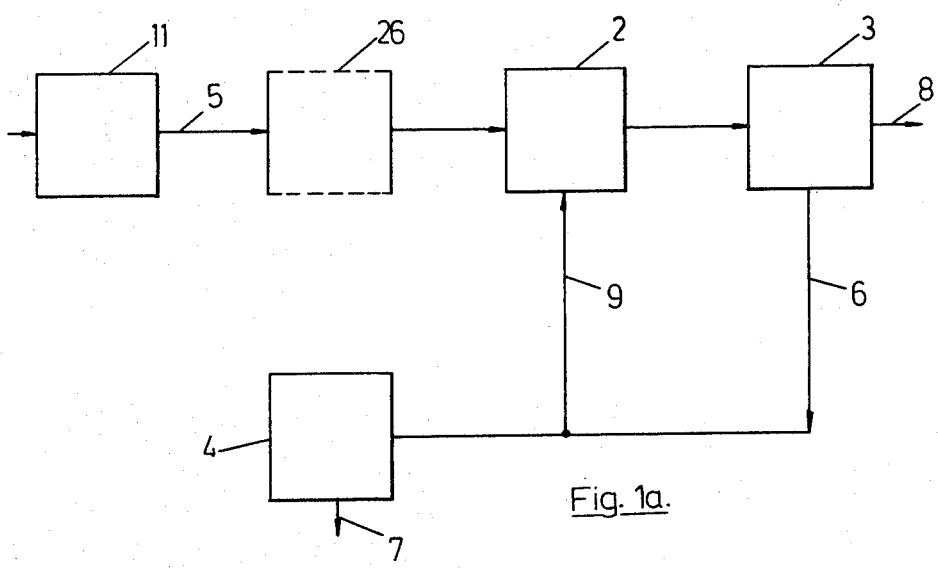
FIG. 1a is a diagram of an alternative form of the system shown in FIG. 1.

In the system shown in FIG. 1a, primary settling is eliminated although primary buffer storage 26 may or may not be provided. The activated sludge system 2 then receives the complete sewage influent after the normal influent operations have been performed.

Spargers 16 and 17 are situated in downcomer 14 and riser 15 respectively and are both connected to compresser 18. The flow of gas to riser 15 and downcomer 14 is controlled by valves 19 and 20 respectively. Operation of valves 19 and 20 is controlled by activator 21 which is connected to flow-velocity measuring device 22 positioned towards the upper end of downcomer 14.

Figure 2:
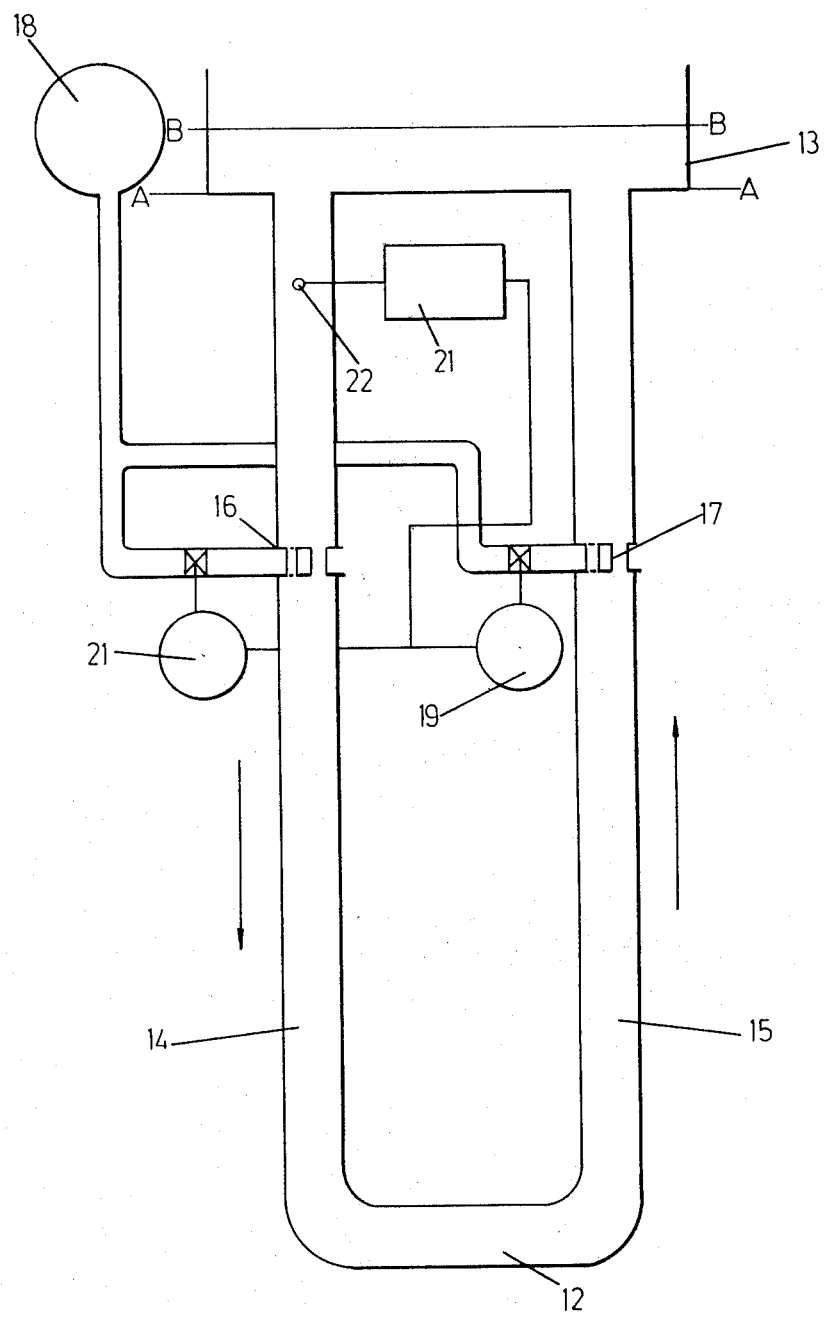
FIGS. 2 and 3 are sectional diagrams of two forms of sewage treatment apparatus according to the preferred embodiment of the invention.

When the apparatus shown in FIG. 2 is used as the activated sludge system 2 of the system shown in FIG. 1, sewage from primary settling tank 1 enters basin 13 through a channel (not shown in FIG. 2) opening into the basin at a point near the open upper end of downcomer 14 and liquid plus activated sludge leaves the basin through another channel (not shown in FIG. 2) opening out of basin 13 at a point below liquid level B—B and located at a distance from the inlet channel and passes to settling tank 3.

With liquid occupying basin 13 up to the level B—B, valve 19 open and valve 20 wholly or partially closed, the system shown in FIG. 2 is started up by injecting air from compressor 18 wholly or mainly into riser 15. This causes the upper part of riser 15 to operate as an air-lift pump and sewage begins to circulate around the system in the direction shown by the arrows in FIG. 2. When the flow rate as measured by device 22 reaches a predetermined minimum value, activator 21 causes valve 19 to be wholly or partially closed and valve 20 to be opened. Desirably the opening of valve 20 and closing of valve 19 takes place in stages as the velocity of the sewage in downcomer 14 increases. When the system is operating steadily all or most of the air is injected into downcomer 14. Flow of sewage around the system may be regulated by altering the amounts of air injected into riser 15 and downcomer 16 should the conditions of operation change for any reason. This control may of course be carried out manually by the operators of the system but is more conveniently performed automatically using activator 21 and device 22.

Figure 3:
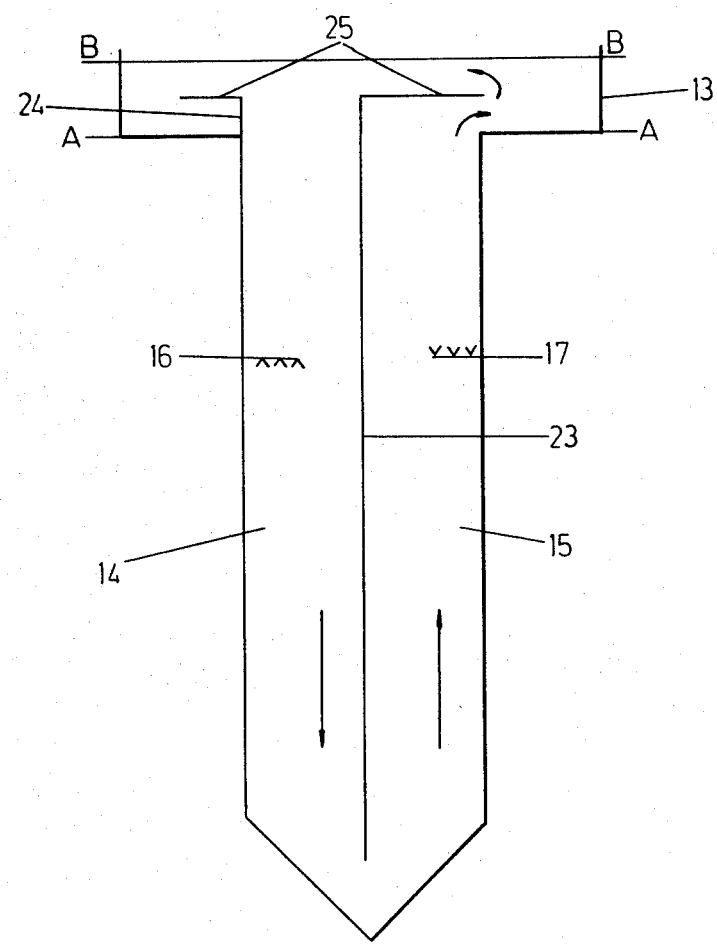

FIG. 3 shows an alternative and preferred form of the apparatus of the invention. In this riser 15 and downcomer 14 are contained within a single vessel divided by partition 23 and extending into a shaft below the base of basin 13. Downcomer 14 extends below the lower end of partition 23 (or alternatively the lower part of partition 23 is perforated) to allow the lower ends of downcomer 14 and riser 15 to communicate with each other. To achieve a suitable flow pattern in basin 13, the upper end 24 of downcomer 14 extends above the base of the basin and flow directing means 25 is provided.

Figure 4:
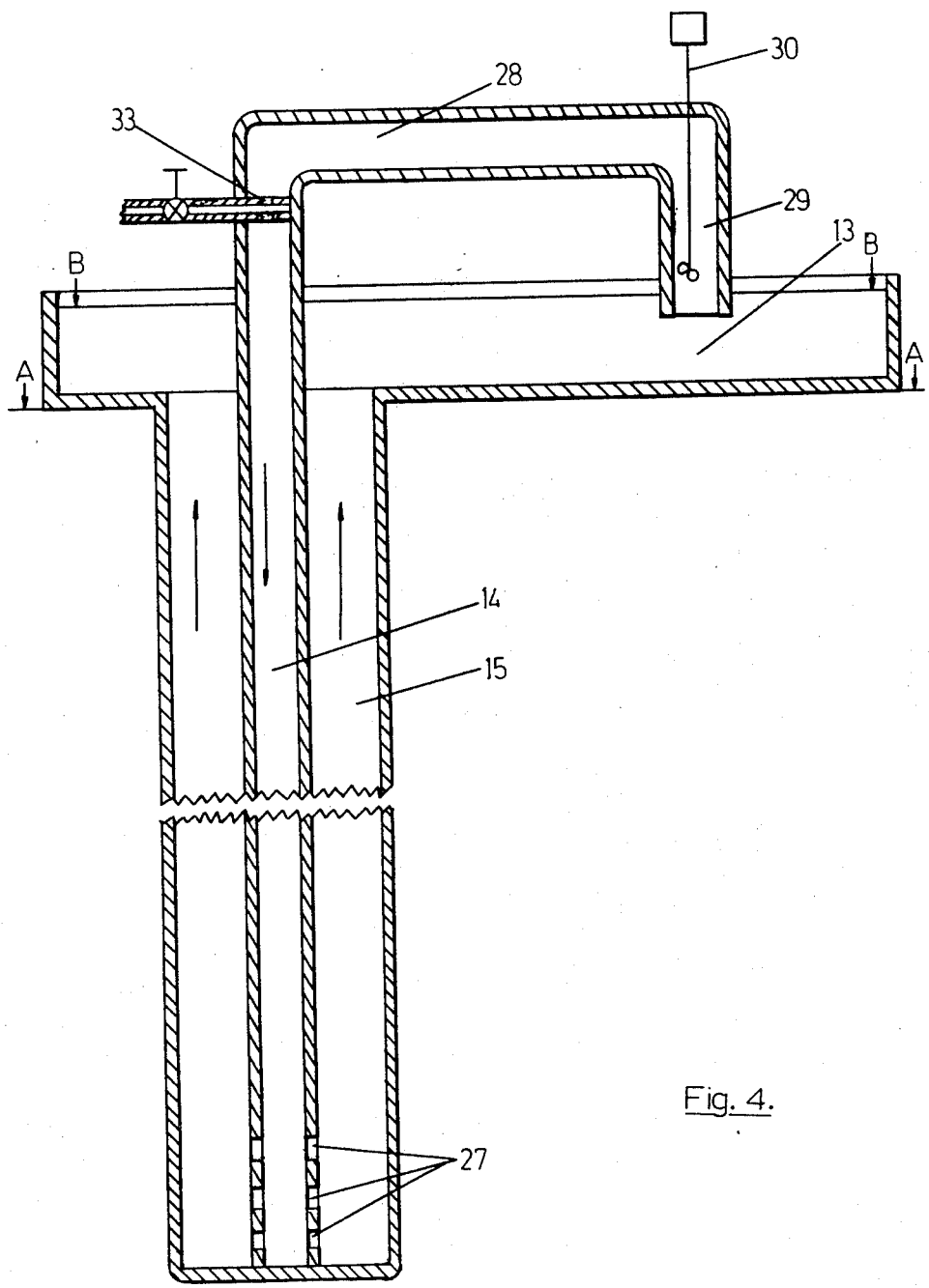
FIGS. 4 and 5 are cross-sectional elevations of two forms of sewage treatment apparatus according to an alternative embodiment of the invention.
Figure 5:
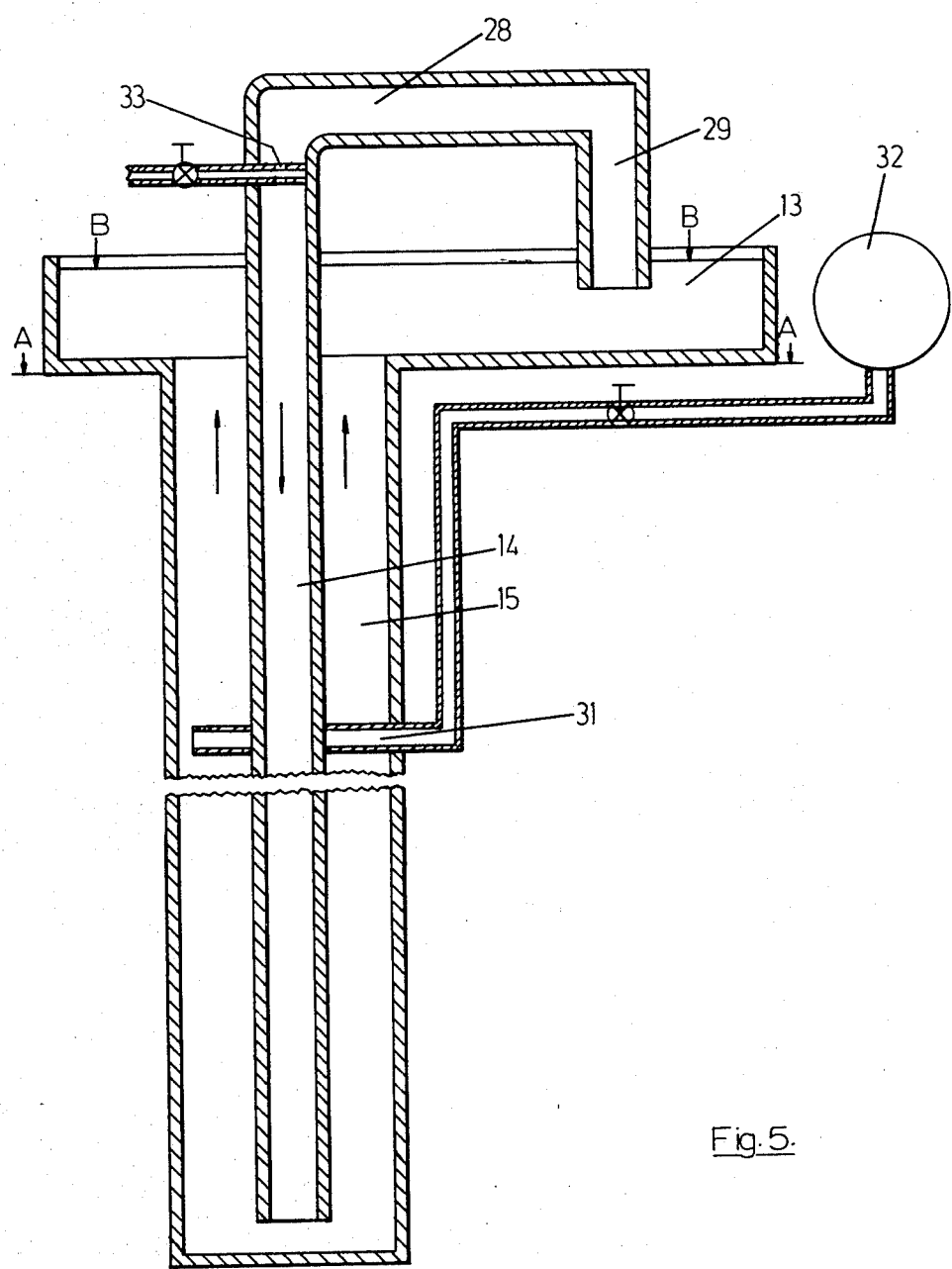

In the two forms of the apparatus of the invention shown in FIGS. 4 and 5 two compartments, riser 15 and downcomer 14, extend downwardly through the base of basin 13, located at ground level (A—A in the drawing), into a shaft beneath it. The two compartments are connected at their lower ends, by openings 27 in FIG. 4 and by a gap between the lower end of downcomer 14 and the lower end of riser 15 in FIG. 5. Downcomer 14 extends above the base of basin 13 and at its upper end is joined to a conduit 28 which extends horizontally and downwardly to form an inverted U-shaped section with the upper end of downcomer 14. When the apparatus is in use the open end of leg 29 of conduit 28 is below the level B—B of liquid contained in basin 13. Liquid circulation is caused by a suitably-driven (e.g. motor) propeller 30 positioned in leg 29 in the apparatus of FIG. 4 and by an oxygen-containing gas injected through sparger 31 into riser 15 in FIG. 5. In FIG. 5 the gas is injected into riser 15 using compressor 32. In the apparatus of both FIGS. 4 and 5 an oxygen-containing gas e.g. air is admitted to the upper end of downcomer 14 through pipe 33 which contains means for regulating the rate of air ingress. When, with the U-shaped section formed by the upper end of downcomer 14 and conduit 28 filled with liquid (air being removed from the U-shaped section using a vacuum pump) and basin 13 filled to the level B—B, propeller 30 is set in operation or gas is sparged into riser 15 through pipe 31, liquid from basin 13 passes through conduit 28 into downcomer 14. It then passes via riser 15 back to basin 13.

Figure 6:
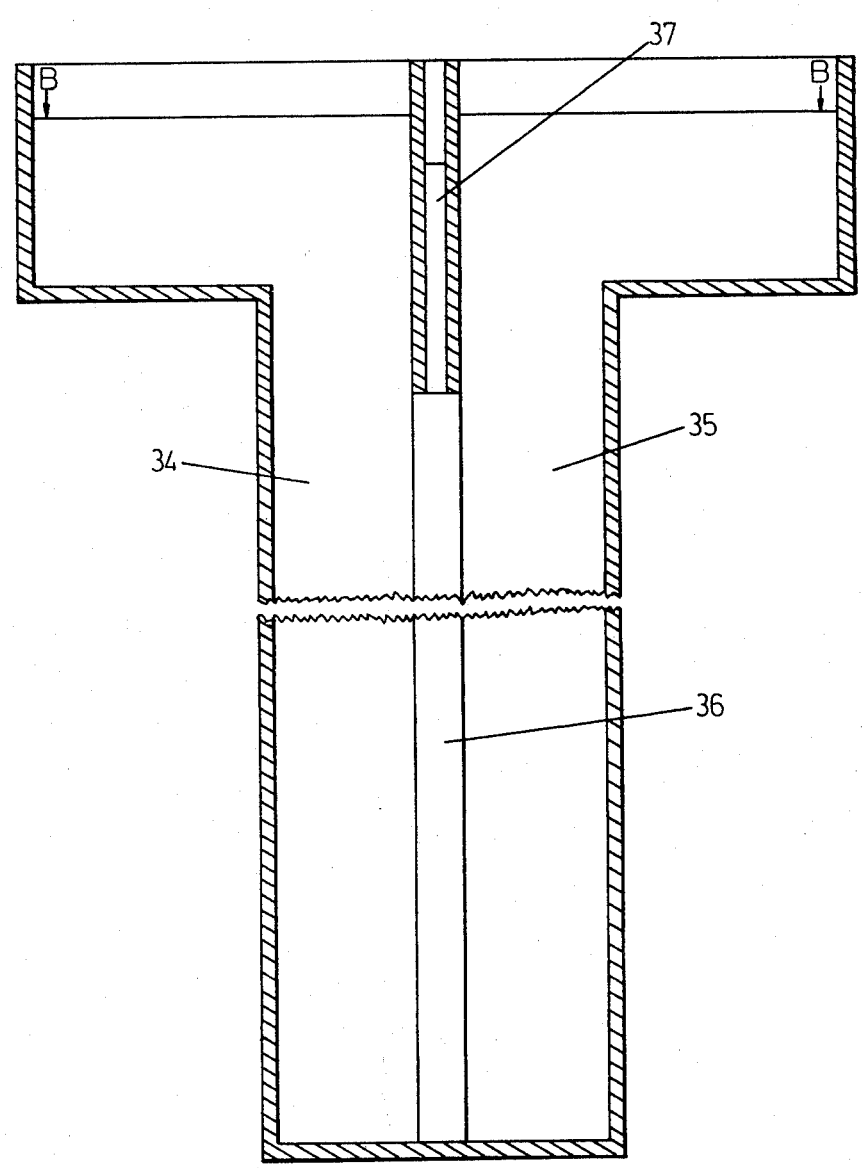
FIG. 6 is a cross-sectional elevation of an apparatus wherein two treatment units are built into a single structure. Internal details of each unit are omitted from this figure.
Figure 7A:
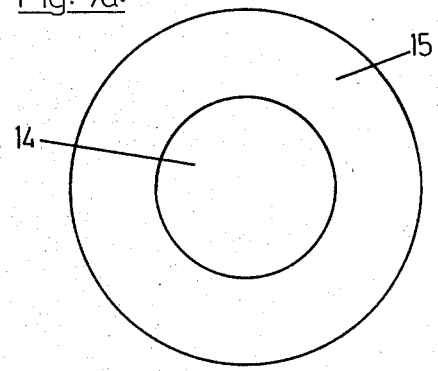
FIGS. 7a, 7b, 7c, 7d, 7e and 7f are plan views of alternative arrangements of risers and downcomers applicable to either the preferred or alternative embodiments.
Figure 7B:
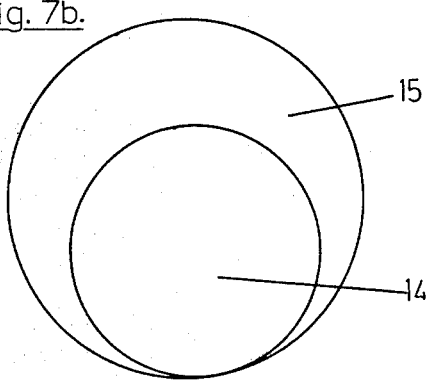
Figure 7C:
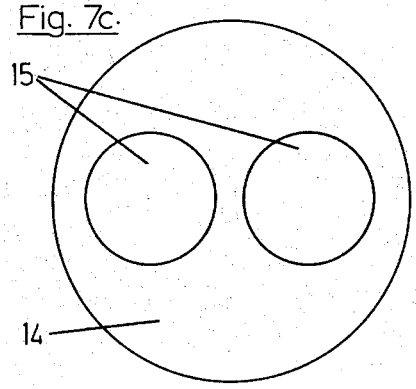
Figure 7D:
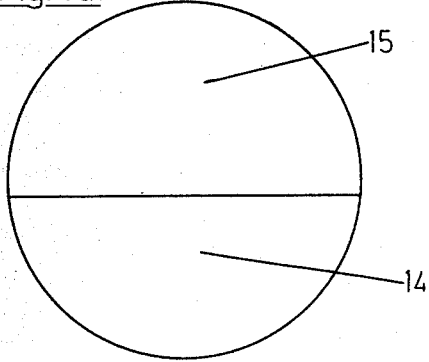
Figure 7E:
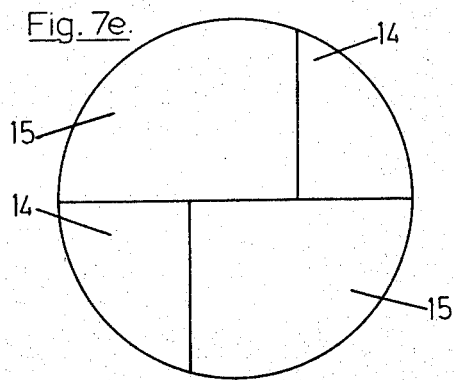
Figure 7F:
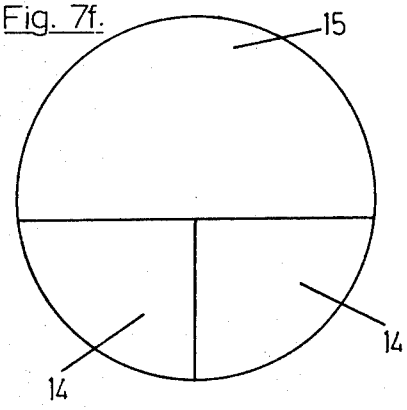

In the system shown in FIG. 6 a digester 34 and an activated sludge system 35 are both incorporated into a single unit being separated by a partition 36. A section 37 of partition 36 towards its upper end is a hollow metal e.g. steel section and contains water whose level is controlled by pump circulation. This serves to transfer heat produced in digester 34 to activated sludge system 35.

The arrangement of risers and downcomers may be any suitable arrangement. A variety of suitable arrangements is shown in FIGS. 7a, 7b, 7c, 7d, 7e and 7f, wherein risers are denoted by 15 and downcomers by 14.

We claim:

1. A method of treating sewage in apparatus including a basin having a downcomer extending downwardly therefrom, and a riser communicating with said downcomer both in said basin and at the lower end of said downcomer, said method comprising the steps of continuously circulating the bulk of sewage contained in the basin-downcomer-riser system at any one time down said downcomer, up said riser, and back down said downcomer until sufficient treatment of the sewage is achieved, said continuous circulation being accomplished by injecting said oxygen-containing gas under pressure into said downcomer below the level of sewage in said basin, supplying oxygen-containing gas to said downcomer so that said gas flows co-currently with sewage flowing down said downcomer, and upwardly with said sewage in said riser, and injecting oxygen-containing gas in said riser so that said gas flows co-currently with sewage flowing up said riser, at least 50% of the gas injected into the system being initially injected into the riser when the liquid velocity in the downcomer is less than 1 meter/sec., and at least 50% of the gas injected into the system being injected into the downcomer when the liquid velocity in the downcomer is above 1 meter/sec.

2. A method of treating sewage in apparatus including a basin having a downcomer extending downwardly therefrom, and a riser communicating with said downcomer both in said basin and at the lower end of said downcomer, said method comprising the steps of continuously circulating the bulk of sewage contained in the basin-downcomer-riser system at any one time down said downcomer, up said riser, and back down said downcomer until sufficient treatment of the sewage is achieved, said continuous circulation being initiated by injecting said gas in said riser to cause an air-pump effect until downflow of sewage in said downcomer is provided, and then adjusting the amount of gas injected into said riser and said downcomer so that at least 50% of the total gas injected into the system is injected into the riser when the liquid velocity in the downcomer is less than 1 meter/sec., and at least 50% of the total gas being injected into the system is injected into the downcomer when the liquid velocity in the downcomer is above 1 meter/second, and supplying oxygen-containing gas to said downcomer so that said gas flows co-currently with sewage flowing down said downcomer, and upwardly with said sewage in said riser.

3. A method of treating sewage in apparatus including a basin having a downcomer extending downwardly therefrom, a riser communicating with said downcomer both in said basin and at the lower end of said downcomer, and an upper low pressure region of said downcomer extending above the entrance of said riser to said basin, said method comprising the steps of continuously circulating the bulk of sewage contained in the basin-downcomer-riser system at any one time down said downcomer, up said riser, drawing sewage from said basin upwardly into said low-pressure region, and back down said downcomer until sufficient treatment of the sewage is achieved, and supplying oxygen-containing gas to said downcomer so that said gas flows co-currently with sewage flowing down said downcomer, and upwardly with said sewage in said riser.

4. A method as recited in claim 3 wherein said drawing of sewage into said low-pressure retion is accomplished by mechanical means.

5. A method as recited in claim 3 wherein said downcomer upper portion extends above the level of sewage in said basin a distance of between 3 and 9 meters, and wherein said step of supplying oxygen-containing gas to said downcomer is accomplished by supplying said gas to said downcomer in said low-pressure region thereof.

6. Apparatus for sewage treatment comprising
a basin,
a downcomer having an upper opening therefor in communication with said basin and extending downwardly from said basin to a bottom opening,
a riser having a bottom opening thereof in communication with the bottom opening of said downcomer and having an upper opening thereof in communication with said basin, said basin, downcomer, and riser comprising a basin-downcomer-riser system,
means for continuously circulating the bulk of sewage contained in the basin-downcomer-riser system at any one time down said downcomer, up said riser, and back down said downcomer until sufficient treatment of the sewage is achieved,
means for supplying oxygen-containing gas to said downcomer so that said gas flows co-currently with sewage flowing downwardly in said downcomer, and upwardly with sewage in said riser, and
means for injecting oxygen-containing gas in said riser, a source of oxygen-containing gas common to both said downcomer and riser injecting means, and valve means for metering the flow of oxygen-containing gas into said downcomer and said riser so that at least 50% of the total gas injected into the system is injected into the riser when the liquid velocity in the downcomer is less than 1 meter/second, and at least 50% of the total gas being injected into the system is injected into the downcomer when the liquid velocity in the downcomer is above 1 meter/second.

7. Apparatus for sewage treatment comprising
a basin,
a downcomer having an upper opening therefor in communication with said basin and extending downwardly from said basin to a bottom opening,
a riser having a bottom opening thereof in communication with the bottom opening of said downcomer and having an upper opening thereof in communication with said basin, said basin, downcomer, and riser comprising a basin-downcomer-riser system,
means for continuously circulating the bulk of sewage contained in the basin-downcomer-riser system at any one time down said downcomer, up said riser, and back down said downcomer until sufficient treatment of the sewage is achieved,
means for supplying oxygen-containing gas to said downcomer so that said gas flows co-currently with sewage flowing downwardly in said downcomer, and upwardly with sewage in said riser,
an upper portion of said downcomer extending above the opening of said riser into said basin, defining a low-pressure region therein, and
mechanical means for drawing sewage from said basin into said downcomer upper portion, said means for injecting gas into said downcomer being located in said low-pressure region thereof.

8. Apparatus as recited in claim 7 wherein said downcomer upper portion extends above the level of sewage in said basin a distance between 3 and 9 meters.

* * * * *